Dec. 22, 1942.      C. WANTZ      2,305,941
SAFETY SHUTOFF DEVICE
Filed May 20, 1940

Inventor:
Clarence Wantz
By Brown, Jackson, Boettcher & Dienner
Attys

Patented Dec. 22, 1942

2,305,941

UNITED STATES PATENT OFFICE 2,305,941

SAFETY SHUTOFF DEVICE

Clarence Wantz, Milwaukee, Wis., assignor to Milwaukee Gas Specialty Company, Milwaukee, Wis., a corporation of Wisconsin Application May 20, 1940, Serial No. 336,111

26 Claims. (Cl. 277—3)

This invention relates to safety shutoff devices and may be characterized as an improvement in thermoelectric safety shutoff devices of the general character shown and described in the copending application of Richard K. Engholdt, Serial No. 328,923, filed April 10, 1940.

One of the main objects of the present invention is to provide an improved pilot fuel supply connection and an improved pilot valve and pilot valve actuator which, while adapted for use with other devices, is especially adapted for use with safety shutoff devices of the general character shown and described in the application mentioned in the preceding paragraph.

It is also an object of the invention to provide in conjunction with a valve seat member adapted for mounting between a pair of valve body parts, a pilot fuel supply connection and an improved pilot valve and pilot valve actuator of simple, inexpensive, and compact construction, and a device composed of few parts and adapted for convenient assembly, installation, and repair.

One of the advantages of the present invention is the ability to deliver the fuel for the pilot burner to the fuel supply passage in the valve seat member independently of the inlet in the main valve body, and the ability to connect a pilot supply pipe to the inlet for this fuel supply passage in the valve seat member externally of the main valve body, the fuel supply passage in the valve seat member also having an outlet for connection with the pilot burner.

Another feature of the particular embodiment of the invention selected for illustration consists in the provision of valve means in the valve seat member for controlling the flow of fuel through the fuel supply passage, in combination with a valve actuator adapted to actuate this valve means to open position and to release the valve means for movement to closed position.

More specific aspects of the invention consist in operating the valve actuator by the main shutoff valve and in the valve opening provided in the valve seat member for placing the inlet of the main valve body in communication with the outlet thereof.

Figure 2:
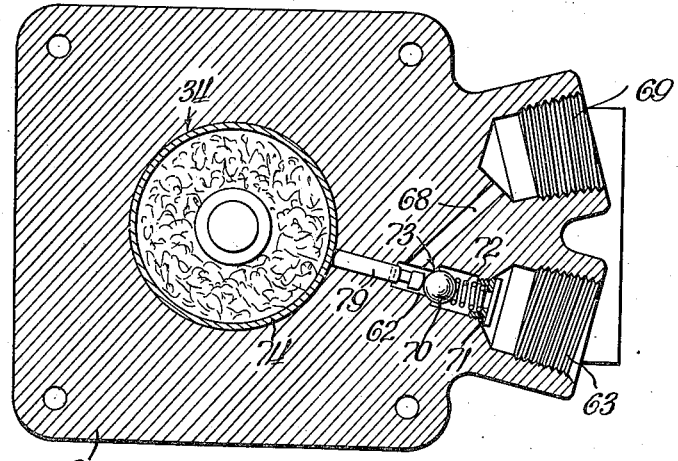
Figure 1:
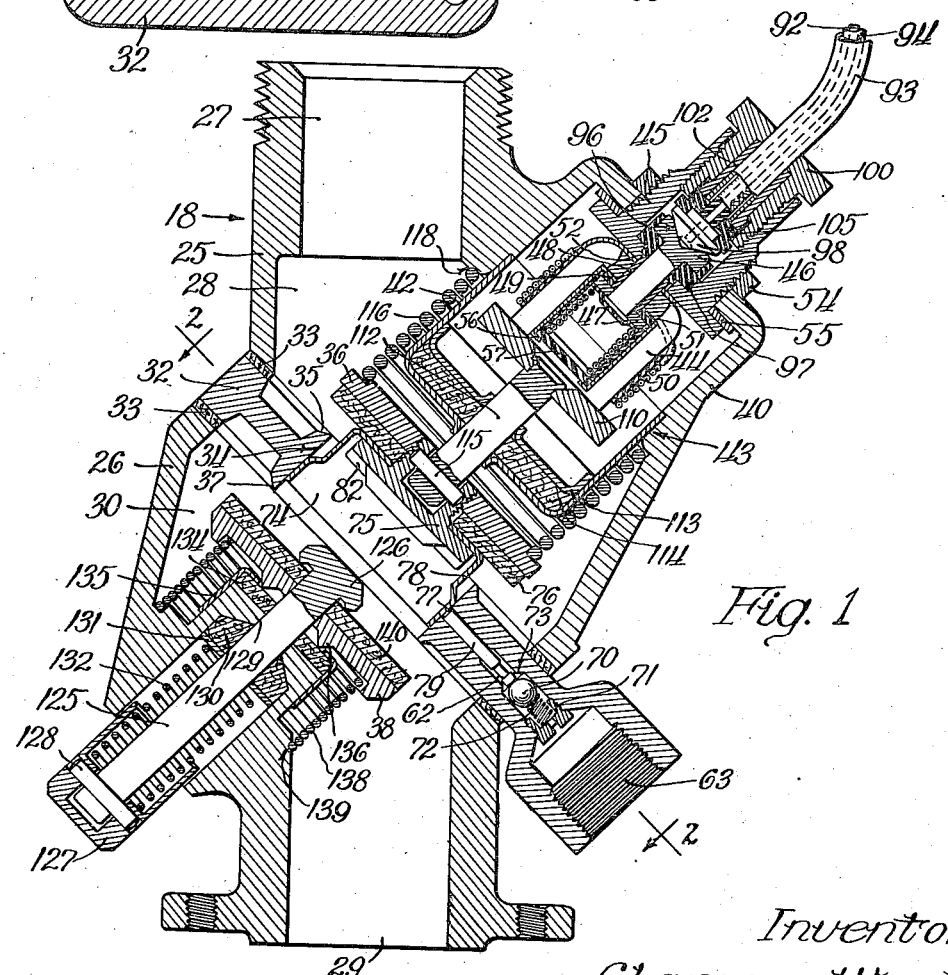

Further objects and further features and advantages of the invention will be apparent from the following detailed description taken in connection with the accompanying drawing, in which:

Figure 1 is a longitudinal section through a safety shutoff device embodying the present invention; and Figure 2 is a section through the valve seat member, taken substantially on the line 2—2 of Figure 1.

The invention can be embodied in a wide variety of forms for use with a wide variety of devices, but for purposes of illustration the invention has been shown as embodied in a manner suitable automatically to close a valve in a fuel supply pipe leading to a burner when the pilot light for the burner goes out.

The present invention resides particularly in the safety shutoff valve 18 with its improved pilot supply connection, pilot valve, and pilot valve actuator.

As shown in detail in Figures 1 and 2, the safety shutoff device 18 comprises a pair of valve body parts 25 and 26 in the form of metal castings or of other suitable form. The body part 25 has an inlet 27 opening into an inlet chamber 28, and the body part 26 has an outlet 29 leading from the outlet chamber 30. The inlet 27 and outlet 29 are shown coaxial, but the sections or parts 25 and 26 may be moved with respect to each other so as to change the angle of the inlet and outlet relative to each other to adapt the device to different positions and to different arrangements of the pipe sections, as will hereinafter appear. This movement of the sections or parts 25 and 26 with respect to each other is also adapted to change the angle at which the terminal means for the electromagnet is directed. The inner ends of the body parts 25 and 26 are finished off parallel to each other and obliquely relative to the common axis of the inlet 27 and outlet 29.

An adjustable and removable valve seat member 32, in the form of a metal casting or of other suitable form, is mounted between the valve body parts 25 and 26 and, more particularly, between the oblique inner ends thereof. Gaskets 33 are preferably provided between the opposite sides of the valve seat member 32 and the valve body parts 25 and 26. The valve seat member 32 has a valve opening 34 through which the inlet chamber 28 is adapted to be placed in communication with the outlet chamber 30. Surrounding one end of the valve opening 34 and at one side of the valve seat member 32 is an annular valve seat 35 for a shutoff valve disk 36. Surrounding the other end of the valve opening 34 and at the other side of the valve seat member 32 is an annular valve seat 37 for a flow interrupter disk 38.

The valve body part 25 has a hollow boss 40, the axis of which is disposed normal to the plane of the valve seat member 32 and obliquely with respect to the axis of the inlet 27. A bearing cup 42 in the form of an outwardly opening cup-shaped metal shell is mounted in the boss 40—for example, by pressed fit engagement of its outer open end in the bore 43.

The electromagnet comprises a generally U-shaped magnet frame 44 positioned within the hollow boss 40 and secured to a terminal bushing 45 by a terminal tip member 46. The shank of the terminal tip member 46 passes through an opening in the base of the magnet frame 44, and a metallic connector tab 47 is secured between its inner headed end and the base of the magnet frame. The shank of the terminal tip 46 is insulated from the magnet frame 44 by insulation indicated at 48, and insulation at 49 is interposed between the connector tab 47 and the magnet frame, and, if desired, between the tab 47 and the coil 50 of the electromagnet.

The coil 50 is wound around the legs of the magnet frame and has one end connected at 51 in circuit with the terminal tip 46. The other end of the coil 50 is clamped at 52 between the base of the magnet frame 44 and the inner end of the terminal bushing 45, and is thereby connected in circuit with the terminal bushing 45 which, in the illustrated embodiment of the invention, extends through an opening in the outer end of the boss 40. The bushing 45 is externally threaded for threaded engagement with a nut 54 by means of which the bushing is clamped in place to the outer end of the boss 40, preferably with a gasket 55 between the headed inner end of the bushing 45 and the end wall of the boss 40. Insulation is preferably provided between the coil and the magnet frame, and an anchor strip 56 holds a coil insulator 57 in place as shown.

The valve seat member 32 has a passage 62 through which fuel is supplied, for example, to a pilot burner. The passage 62 has an externally positioned inlet 63 for receiving fuel independently of the inlet 27. The inlet 63 is adapted for connection to a pilot supply pipe. An outlet passage 68 opens from the passage 62 and, with the passage 62, constitutes the fuel supply passage for the pilot burner. This outlet passage 68 has an outlet 69 which is connected to a pilot supply pipe which leads, for example, to the pilot burner.

A pilot valve member 70, operable in the outer enlarged end of the passage 62, controls the flow of fuel to the pilot burner. A ported spring seating member 71 is threaded into the passage 62, and a coiled spring 72 interposed between this member and the valve 70 is adapted to actuate the valve 70 into closed position against the seat 73 and to hold the valve in this position. The valve actuating means comprises a generally cup-shaped valve actuator 74, the base of which is secured to the shutoff valve 36, for example, by the screw 75 or other means for clamping the valve gasket or yielding valve facing 76 in place.

The valve actuator 74 has an enlarged cylindrical wall 77 which operates slidingly in the valve opening 34 and a reduced portion 78. The pilot valve actuating stem 79 operates slidingly in the valve seat member 32. When the shutoff valve 36 is open as shown in Figure 1, the enlarged portion 77 of the valve actuator 74, which, as already pointed out, slides in the opening 34 and is guided thereby by cooperation with the inner end of the stem 79, actuates this stem 79 outwardly, thereby causing the stem to press the valve member 70 outwardly to open position away from its seat 73. The fuel for the pilot burner, assuming that the valve 67 is open, then enters the pilot inlet 63 and passes through the passages 62 and 68, pilot outlet 69, and the pilot supply pipe to the pilot burner.

When the shutoff valve 36 is closed, the reduced portion 78 of the valve actuator 74 is positioned adjacent the inner end of the valve actuating stem 79, thereby releasing the valve member 70 for actuation to closed position by the spring 72. In the arrangement described, the pilot valve 70 seats in the direction of flow of fuel to the pilot burner, with obvious advantages, but this may, of course, vary within the scope of the present invention. The pilot valve actuator 74 has openings 82 of relatively large total area for the free passage of fuel from the inlet 28 to the outlet 29 and thereby to the main burner when the shutoff valve 36 is open.

A thermocouple may be placed in position so that the hot junction thereof will be heated by the pilot flame as long as the pilot flame is burning. The thermocouple and pilot burner may be of any suitable or preferred construction. In general, the particular construction selected for illustration is similar to that more fully described in the copending application of Henry F. Alfery, Serial No. 267,731, filed April 13, 1939.

The thermocouple may comprise an external metallic tubular thermocouple element and an internal metallic thermocouple element of dissimilar metal disposed within the external thermocouple element and joined at its outer end to the outer end of the internal thermocouple element to form the thermojunction which is adapted to be heated by the pilot flame.

The lead conductor means comprises an inner lead conductor 92, one end of which is connected in circuit with the inner thermocouple element, and an outer tubular lead conductor 93 enclosing and insulated at 94 from the inner lead conductor and having its adjacent end connected in circuit with the outer thermocouple element.

For the purpose of providing a quick detachable connection between the opposite ends of the lead conductors 92 and 93 and the electromagnet, the outer headed end of the terminal tip 46 has a generally conical recess 96. An insulator sleeve 97 is positioned between the headed outer end and the adjacent portion of the shank of the terminal tip 46 and the bushing 45. The extending end of the inner lead conductor 92 has fixed thereon a connector cone 98 which seats in the recess 96 and is clamped in contact with the recessed end of the terminal tip 46 by a connector sleeve 100. The sleeve 100 has threaded engagement with the interior of the outer end of the bushing 45. A connector sleeve 102 fixed on the outer lead 93 makes good contact with the sleeve 100 upon threading the same into place to clamp the cone 98 in contact with the terminal tip 46.

Thus, when the quick detachable connection is made as shown in Figure 1, a circuit is completed from the internal thermocouple member through the inner lead 92, cone 98, and terminal tip 46 to one terminal of the coil 50, and from the outer thermocouple member through the outer lead 93, connector sleeve 100 and bushing 45 to ground through the valve body to which the other terminal of the coil is grounded, or to the other terminal of the coil without grounding to the valve body, if desired. Insulation at 105 insulates the cone 98 from the sleeves 100 and 102.

The electromagnet has an armature 110 operable within the cup 42. The armature 110 is attached to the outer end of a stem 112, if desired, in a manner to permit self-accommodation of the armature when in attracted position to the pole faces of the magnet frame 44. The stem 112 extends inwardly for reciprocatory movement through an opening in the inner end of the cup 42. A guide cup is provided at 113, and felt or other suitable sealing material 114 is provided around the stem 112 and between the guide cup 113 and the inner end of the cup 42.

The shutoff valve disk 36 is attached to the inner end of the stem 112, for example, by a pin 115 and preferably in a manner to permit self-accommodation of the shutoff valve disk 36 to the valve seat 35. A valve spring 116 is coiled about the cup 42 and is interposed between the valve disk 36 and a shoulder or abutment 118 in the body member 25.

The body parts 25 and 26 are secured together, with the valve seat member 32 and gaskets 33 therebetween, by screws or other suitable fastening means. The screws (not shown) are so arranged that the valve seat member 32 may be clamped in place between the body parts 25 and 26 with the pilot inlet 63 and pilot outlet 69 directed as shown, or, for example, in a direction 90 degrees, 180 degrees, or 270 degrees from the directions shown. The particular number of angles or directions in which the pilot connections may be directed may vary widely within the scope of the present invention. The particular construction shown is adapted for directing the pilot connections 63 and 69 in four equi-spaced directions, but by making, for example, the attachment flanges of the body parts 25 and 26 of suitable form and providing additional screws 120 and additional openings therefor, additional directions may be provided for as suitable or desired.

The ability to change the direction of the pilot connections 63 and 69 merely by clamping the valve seat member 32 in different positions facilitates connecting the pilot supply tube to the pilot burner with different positions of the pilot burner relative to the safety shutoff device; also with a minimum number of bends in the pilot supply tubes; and, if desired, without disturbing the position of the safety shutoff device as a whole. At the same time the inlet and outlet sections 25 and 26 may be moved relative to each other and clamped together in different relative positions so as to change the angle of the inlet 27 and outlet 29 relative to each other to adapt the device to different positions and to different arrangements of the fuel supply pipe sections 15. This relative movement of the sections or parts 25 and 26 with respect to each other is also adapted to change the angle at which the terminal means for the electromagnet is directed.

The removable character of the seating section 32 facilitates repair, for example, in the event of damage to the valve seat or valve seats, so that the device need not be scrapped in its entirety in the event the valve seat or valve seats should be defective. Moreover, the removable character of the valve seat section facilitates die casting of the parts of the body of the device.

The pilot supply passage in the valve seat member, with its inlet 63 and outlet 69, makes it possible to deliver the fuel for the pilot burner independently of the inlet 28 of the main valve body, and the valve means in the valve seat member controls the flow of fuel through the pilot supply passage.

The heat of the pilot light upon the thermocouple is sufficient to hold the armature 110 in attracted position and the valve member 36 in open position as shown in Figure 1 when the armature is engaged with the pole ends of the magnet frame, but this thermoelectric current is not capable of moving the armature to attracted position and the valve member 36 to open position. In order, therefore, to provide for opening the valve member 36 and for setting the armature to attracted position, reset means is provided. This reset means comprises a reset stem 125 coaxial with the shutoff valve 36 and extending from the body part 26 obliquely with respect to the axis of the outlet 29.

The inner end of the reset stem 125 is headed at 126, and a reset button 127 is secured to the outer end of the reset stem, for example, by a pin 128. The reset stem 125 is guided at 129 in the body part 26, and the opening through which the stem extends is sealed by suitable packing 130. A packing washer is provided at 131, and a reset spring 132 is coiled about the reset stem and interposed between this packing washer and the reset button 127.

A reset gasket 134 is held in place by a reset gasket cup 135, and the flow interrupter disk 38 which is slidable on the reset stem 125 has rib means at 136 which cooperates with the gasket 134 when the flow interrupter disk 38 is in the position shown in Figure 4. The cooperation of the rib means 136 with the gasket 134 tends to prevent the escape of gas or other fuel from the outlet chamber 30 through the resetting means. A coiled flow interrupter spring 138 is interposed between the flow interrupter disk 38 and an abutment 139 in the body part 26. The flow interrupter disk 38 preferably has a valve gasket or yielding facing 140 for cooperation with the valve seat 37.

The operation of the apparatus is generally as follows:

When the pilot light is burning, the heat thereof on the thermal junction at the outer end of the thermocouple produces a thermoelectric current in the coil 50. The magnet frame and armature are preferably formed of an alloy of relatively low magnetic reluctance, and, as a result, the relatively weak thermoelectric current produces a magnetic field of sufficient strength so that when the armature 110 is placed in contact with the pole ends of the magnet frame 44 by pushing the reset stem 125 inwardly, the magnetic attraction holds the armature in attracted position against the magnet frame and the shutoff valve 36 in open position as long as the pilot flame is burning. The gas or other fuel enters the safety shutoff device through the inlet 27 and flows out through the openings 82 in the valve actuator 74 and outlet 29 to the main burner.

With the shutoff valve in open position, the pilot valve actuator 74 is positioned as shown in Figure 1, and by its cooperation with the stem 79 holds the pilot valve 70 in open position. As a result, the gas or other fuel from the pilot supply pipe 65 passes in through the inlet 63 and through the pilot supply passages 62 and 68 and out through the outlet 69 and connected pilot supply pipe 65' to the pilot burner 60.

If the pilot flame is extinguished, the holding action of the electromagnet ceases to be sufficient to hold the armature 110 in attracted position and the valve 36 in open position. As a result, the valve member 36 is moved by the spring 116 to closed position against the seat 35 to shut off the supply of fuel to the main burner 10. At the same time the movement of the valve actuator 74 which accompanies the movement of the shutoff valve 36 to closed position brings the reduced portion 78 of the valve actuator into position adjacent the end of the stem 79. As a result, the valve 70 is released for movement to closed position by the spring 72 which shuts off the supply of fuel to the pilot burner 60.

When it is desired to reset the device, the reset button 127 is engaged with the hand or fingers and pressed inwardly. The accompanying inward movement of the reset stem allows the spring 138 to move the flow interrupter disk 38 to closed position against the seat 37 to shut off the supply of fuel to the main burner during the resetting operation. As the reset stem continues to move inwardly, its inner headed end engages the screw 75 and moves the armature 110 to attracted position and the shutoff valve 36 to open position.

The movement of the valve actuator 74 which accompanies movement of the shutoff valve 36 to open position brings the enlarged portion 77 of the actuator into cooperation with the stem 79 to actuate the pilot valve 70 to open position. Fuel thereupon flows through the pilot supply connections in the valve seat member 32 to the pilot burner, and if the pilot burner is lighted and sets up a thermoelectric current to hold the armature in attracted position, the shutoff valve 36 will remain open, and when the reset stem 125 is released it is returned to outwardly projected position as shown in Figure 1. As the reset stem is moved to its outwardly projected position by the spring 132, the flow interrupter disk 38 is opened against the action of the spring 138 and fuel thereupon passes to the main burner where it is lighted by the pilot burner.

If, on the other hand, the pilot burner is not lighted to produce the thermoelectric current for holding the shutoff valve 136 open, this valve will move to closed position upon release of the reset button.

The safety shutoff device of the present invention is of relatively great capacity within relatively limited space and is of simple, inexpensive and compact construction. Moreover, the device is composed of relatively few parts which are adapted for convenient assembly and installation.

I do not intend to be limited to the precise details shown or described.

I claim:

1. In a device of the class described, in combination, a pair of valve body parts, one having an inlet and the other having an outlet, a valve seat member mounted between said valve body parts, and a fuel supply passage in said valve seat member, said passage having an inlet for receiving fuel independently of said first mentioned inlet and an outlet for delivering the fuel from said passage independently of said first mentioned outlet.

2. In a device of the class described, in combination, a pair of valve body parts, one having an inlet and the other having an outlet, a valve seat member mounted between said valve body parts, a fuel supply passage in said valve seat member, said passage having an inlet for receiving fuel independently of said first mentioned inlet and an outlet for delivering the fuel from said passage independently of said first mentioned outlet, and valve means mounted in said valve seat member for controlling the flow of fuel through said fuel supply passage.

3. In a device of the class described, in combination, a pair of valve body parts, one having an inlet and the other having an outlet, a valve seat member mounted between said valve body parts, a fuel supply passage in said valve seat member, said passage having an inlet for receiving fuel independently of said first mentioned inlet and an outlet for delivering the fuel from said passage, valve means mounted in said valve seat member for controlling the flow of fuel through said fuel supply passage, and a valve actuator operable to actuate said valve means to open position and to release said valve means for movement to closed position.

4. In a device of the class described, in combination, a pair of valve body parts, one having an inlet and the other having an outlet, a valve seat member mounted between said valve body parts and having a valve opening for placing said inlet in communication with said outlet, a fuel supply passage in said valve seat member, said passage having an externally positioned inlet adapted for connection with a pilot supply pipe externally of said body parts and an outlet for delivering fuel from said passage. valve means mounted in said valve seat member for controlling the flow of fuel through said fuel supply passage, and a valve actuator operable in the valve opening in said valve seat member to actuate said valve means to open position and to release said valve means for movement to closed position.

5. In a device of the class described, in combination, a pair of valve body parts, one having an inlet and the other having an outlet, a valve seat member mounted between said valve body parts and having a valve opening for placing said inlet in communication with said outlet, a shutoff valve cooperable with one side of said valve seat member to close said valve opening and thereby shut off the flow of fuel through said outlet, a fuel supply passage in said valve seat member, said passage having an inlet for receiving fuel independently of said first mentioned inlet and an outlet for delivering the fuel from said passage, valve means mounted in said valve seat member for controlling the flow of fuel through said fuel supply passage, and a valve actuator operated by said shutoff valve for opening said last mentioned valve means when said shutoff valve is opened and releasing said valve means for movement to closed position when the shutoff valve is closed.

6. In a device of the class described, in combination, a pair of valve body parts, one having an inlet and the other having an outlet, a valve seat member mounted between said valve body parts and having a valve opening for placing said inlet in communication with said outlet, a shutoff valve cooperable with one side of said valve seat member to close said valve opening and thereby shut off the flow of fuel through said outlet, a fuel supply passage in said valve seat member, said passage having an inlet for receiving fuel independently of said first mentioned inlet and an outlet for delivering the fuel from said passage, valve means mounted in said valve seat member for controlling the flow of fuel through said fuel supply passage, and a valve actuator carried by said shutoff valve and operable in the valve opening in said valve seat member to actuate said last mentioned valve means to open position when the shutoff valve is opened and releasing said valve means for movement to closed position when the shutoff valve is closed.

7. In a device of the class described, in combination, a pair of valve body parts, one having an inlet and the other having an outlet, a valve seat member mounted between said valve body parts and having a valve opening for placing said inlet in communication with said outlet, a shutoff valve cooperable with one side of said valve seat member to close said valve opening and thereby shut off the flow of fuel through said outlet, an electromagnet on one valve body part, an armature for said electromagnet which, when attracted, holds said shutoff valve in open position, and, when retracted, releases said valve for movement to closed position, a fuel supply passage in said valve seat member, said passage having an inlet for receiving fuel independently of said first mentioned inlet and an outlet for delivering the fuel from said passage, valve means mounted in said valve seat member for controlling the flow of fuel through said fuel supply passage, a valve actuator operated by said shutoff valve for opening said last mentioned valve means when said shutoff valve is opened and releasing said valve means for movement to closed position when the shutoff valve is closed, means for resetting the armature to attracted position and the shutoff valve to open position, and a flow interrupter valve cooperable with the opposite side of said valve seat member for interrupting the flow through said outlet during the resetting operation.

8. In a device of the class described, in combination, a pair of valve body parts, one having an inlet and the other having an outlet, means for securing said valve body parts together in different relative positions to change the angle of the inlet and outlet relative to each other, a seating member having a valve opening placing said inlet in communication with said outlet, said member being adapted to be mounted in different positions between said valve body parts, and a fuel supply passage in said seating member, said passage having an inlet for receiving fuel independently of said first mentioned inlet and an outlet for delivering the fuel from said passage independently of said first mentioned outlet.

9. In a device of the class described, in combination, a pair of valve body parts, one having an inlet and the other having an outlet, means for securing said valve body parts together in different relative positions to change the angle of the inlet and outlet relative to each other, a valve seat member having a valve opening placing said inlet in communication with said outlet, said member being adapted to be mounted in different positions between said valve body parts, a fuel supply passage in said valve seat member, said passage having an inlet for receiving fuel independently of said first mentioned inlet and an outlet for delivering the fuel from said passage, a shutoff valve cooperable with one side of said valve seat member to close the valve opening therethrough and thereby shut off the flow of fuel through said outlet, valve means mounted in said valve seat member for controlling the flow of fuel through said fuel supply passage, and a valve actuator operated by said shutoff valve for opening said last mentioned valve means when said shutoff valve is opened and releasing said valve means for movement to closed position when the shutoff valve is closed.

10. As a unitary device, a valve seat member having a valve opening and a fuel supply passage in said valve seat member, said passage having an externally positioned inlet adapted for connection with a fuel supply pipe and an externally positioned outlet for delivering fuel from said passage.

11. As a unitary device, a valve seat member having a valve opening, a fuel supply passage in said valve seat member, said passage having an externally positioned inlet adapted for connection with a fuel supply pipe and an externally positioned outlet for delivering fuel from said passage, and valve means mounted in said valve seat member for controlling the flow of fuel through said fuel supply passage.

12. As a unitary device, a valve seat member having a valve opening, a fuel supply passage in said valve seat member, said passage having an externally positioned inlet adapted for connection with a fuel supply pipe and an outlet for delivering fuel from said passage, valve means mounted in said valve seat member for controlling the flow of fuel through said fuel supply passage, and a valve actuator operable in the valve opening in said valve seat member to actuate said valve means to open position and to release said valve means for movement to closed position.

13. In combination, a supply pipe, a valve in said pipe, said valve comprising a pair of valve body parts, one having an inlet and the other having an outlet, a valve seat member mounted between said valve body parts and having a valve opening for placing said inlet in communication with said outlet, a supply passage in said valve seat member, said last mentioned supply passage having an inlet and an outlet each in position externally of the valve body parts, a supply pipe connected to the inlet of said supply passage, and a supply pipe leading from the outlet of said supply passage.

14. In combination, a shutoff valve, an electromagnet which, when energized, holds said valve in open position, and when deenergized releases said valve for movement to closed position, pilot valve means under the control of said shutoff valve and operable in a lateral direction relative to the direction of movement of said shutoff valve, and pilot valve actuator means carried by said shutoff valve and engageable in the opening movement of said shutoff valve with said pilot valve means to force said pilot valve means to open position, said pilot valve actuator means being out of actuating engagement with said pilot valve means when said shutoff valve is closed.

15. In a device of the class described, in combination, a pair of valve body parts one having an inlet and the other having an outlet, a valve seat member mounted between said valve body parts and having a valve opening for placing said inlet in communication with said outlet, said valve seat member having a passage therein provided with an outlet positioned externally of said valve body parts, means carried by said valve seat member and positioned externally of said valve body parts for connecting a fluid supply line to said last mentioned outlet, and means for securing said valve seat member in different relative positions between said valve body parts to change the position of said last mentioned connecting means.

16. In a device of the class described, in combination, a pair of valve body parts one having an inlet and the other having an outlet, a valve seat member mounted between said valve body parts and having a valve opening for placing said inlet in communication with said outlet, said valve seat member having a passage therein, said passage having an inlet and an outlet each positioned externally of said valve body parts and adapted for connection with contiguous sections of a fluid supply pipe, and means for securing said valve seat member in different relative positions between said valve body parts to change the positions of said inlet and outlet connections.

17. In a device of the class described, in combination, a pair of valve body parts one having an inlet and the other having an outlet, a valve seat member mounted between said valve body parts and having a valve opening for placing said inlet in communication with said outlet, a shutoff valve engageable with said valve seat member when closed, an electromagnet which, when energized, holds said shutoff valve in open position, and, when deenergized, releases said valve for movement to closed position, and a valve under the control of said shutoff valve and operable in said valve seat member in a generally lateral direction relative to the direction of movement of said shutoff valve.

18. In a device of the class described, in combination, a pair of valve body parts one having an inlet and the other having an outlet, a valve seat member mounted between said valve body parts and having a valve opening for placing said inlet in communication with said outlet, a shutoff valve engageable with said valve seat member when closed, an electromagnet which, when energized, holds said shutoff valve in open position, and, when deenergized, releases said valve for movement to closed position, a second valve operable in said valve seat member in a generally lateral direction relative to the direction of movement of said shutoff valve, and a valve actuator carried by said shutoff valve and operable in the valve opening in said valve seat member for actuating said second valve.

19. In combination, a valve body having an inlet chamber, an outlet chamber, and a wall separating said inlet chamber from said outlet chamber and provided with a valve opening for placing said inlet chamber in communication with said outlet chamber, a shutoff valve for closing communication between said inlet and outlet chambers through said valve opening, a second valve, and a valve actuator carried by said shutoff valve and guided in said valve opening for actuating said second valve to open position in movement of said shutoff valve to open position.

20. In combination, a valve body having an inlet chamber, an outlet chamber, and a wall separating said inlet chamber from said outlet chamber and provided with a valve opening for placing said inlet chamber in communication with said outlet chamber, a shutoff valve for closing communication between said inlet and outlet chambers through said valve opening, a second valve, a plunger for actuating said second valve and operable slidingly in the separating wall between the inlet and outlet chambers, with its inner end exposed at the periphery of the valve opening in said wall, and a valve actuator carried by said shutoff valve and guided in said valve opening, said valve actuator cooperating with the inner end of said plunger to actuate said second valve.

21. In combination, a valve body having an inlet chamber, an outlet chamber, and a wall separating said inlet chamber from said outlet chamber and provided with a valve opening for placing said inlet chamber in communication with said outlet chamber, a shutoff valve for closing communication between said inlet and outlet chambers through said valve opening, a second valve, a plunger for actuating said second valve and operable slidingly in the separating wall between the inlet and outlet chambers, with its inner end exposed at the periphery of the valve opening in said wall, a valve actuator carried by said shutoff valve and guided in said valve opening, said valve actuator cooperating with the inner end of said plunger to actuate said second valve in one direction, said valve actuator having a reduced portion spaced from the periphery of the valve opening, and means for actuating said second valve in the opposite direction when the reduced portion of said valve actuator is in register with the inner end of said plunger.

22. In a device of the class described, in combination, a pair of valve body parts, one having an inlet and the other having an outlet, a valve seat member mounted between said valve body parts and having a valve opening for placing said inlet in communication with said outlet, said valve seat member having an inlet and an outlet each disposed at the outer periphery of said valve seat member and externally of said valve body parts, and passage means in said valve seat member for providing communication between the inlet and outlet at the outer periphery of said valve seat member.

23. In a device of the class described, in combination, a pair of valve body parts, one having an inlet and the other having an outlet, a valve seat member mounted between said valve body parts and having a valve opening for placing said inlet in communication with said outlet, said valve seat member having an inlet and an outlet each disposed at the outer periphery of said valve seat member and externally of said valve body parts, passage means in said valve seat member for providing communication between the inlet and outlet at the outer periphery of said valve seat member, and a plunger operable generally laterally in said valve seat member with its inner end exposed at the periphery of the valve opening in the valve seat member for controlling said passage.

24. In a device of the class described, in combination, a pair of valve body parts, one having an inlet and the other having an outlet, a valve seat member mounted between said valve body parts and having a valve opening for placing said inlet in communication with said outlet, said valve seat member having an inlet and an outlet each disposed at the outer periphery of said valve seat member and externally of said valve body parts, passage means in said valve seat member for providing communication between the inlet and outlet at the outer periphery of said valve seat member, a plunger operable generally laterally in said valve seat member with its inner end exposed at the periphery of the valve opening in the valve seat member for controlling said passage, and an actuator guided in the valve opening in the valve seat member for actuating said plunger.

25. In a device of the class described, a shutoff valve, an armature connected to said shutoff valve, an electromagnet which, when energized, holds said armature in attracted position and said shutoff valve in open position, reset means for resetting said armature to attracted position and said shutoff valve to open position, and pilot valve means under the control of said reset means and operable to open position in a generally lateral direction relative to the direction of movement of said shutoff valve in the resetting movement of said reset means.

26. In combination, a shutoff valve, an electromagnet which, when energized, holds said valve in open position and when deenergized releases said valve for movement to closed position, and a pilot valve under the control of said shutoff valve and operable to open position by the movement of said shutoff valve to open position and in a generally lateral direction relative to the direction of movement of said shutoff valve.

CLARENCE WANTZ.